United States Patent [19]

Janiszewski

[11] Patent Number: 5,620,387

[45] Date of Patent: Apr. 15, 1997

[54] DRIVE UNIT FOR A MOTOR VEHICLE

[75] Inventor: Grzegorz Janiszewski, Angered, Sweden

[73] Assignee: AB Volvo, Gothenburg, Sweden

[21] Appl. No.: 496,620

[22] Filed: Jun. 29, 1995

[30] Foreign Application Priority Data

Jun. 29, 1994 [SE] Sweden ................... 9402303

[51] Int. Cl.$^6$ ................................ F16H 48/30
[52] U.S. Cl. .................. 475/150; 475/207; 180/65.7
[58] Field of Search ................... 475/149, 150, 475/207; 180/65.1, 65.5, 65.6, 65.7

[56] References Cited

U.S. PATENT DOCUMENTS

| 2,408,993 | 10/1946 | Nardone | 475/149 X |
|---|---|---|---|
| 4,406,340 | 9/1983 | Gennaux | 475/149 X |
| 4,418,777 | 12/1983 | Stockton . | |
| 4,423,794 | 1/1984 | Beck | 475/149 X |
| 4,479,404 | 10/1984 | Stockton | 475/149 |
| 5,017,183 | 5/1991 | Teraoka | 475/150 |
| 5,289,890 | 3/1994 | Toyoda et al. | 180/65.7 X |
| 5,334,116 | 8/1994 | Baxter, Jr. | 475/149 X |
| 5,387,161 | 2/1995 | Shibahata | 475/150 X |
| 5,396,968 | 3/1995 | Hasebe et al. | 475/150 X |
| 5,419,406 | 5/1995 | Kawamoto et al. | 180/65.6 |
| 5,427,196 | 6/1995 | Yamaguchi et al. | 180/65.6 X |
| 5,433,282 | 7/1995 | Moroto et al. | 180/65.6 X |
| 5,435,794 | 7/1995 | Mori et al. | 475/343 |
| 5,443,130 | 8/1995 | Tamaka et al. | 180/65.6 |
| 5,503,602 | 4/1996 | Dick | 475/150 X |
| 5,508,574 | 4/1996 | Vlock | 475/149 X |

FOREIGN PATENT DOCUMENTS 0587389  3/1994  European Pat. Off. .

*Primary Examiner*—Charles A. Marmor
*Assistant Examiner*—Peter T. Kwon
*Attorney, Agent, or Firm*—Young & Thompson

[57] ABSTRACT

Drive unit for an electrically powered vehicle, comprising an electric motor (1) and a transmission (2) coupled between the electric motor and the drive axles (30,31) of the vehicle. The transmission (2) has a cylindrical speed reducer (8) with two reduction steps and two different gear ratios, a planetary gear set (9) driven by the speed reducer and which provides a third reduction step and which drives a differential (10) to which the drive axles are coupled. One drive axle (31) extends through the transmission and the electric motor.

7 Claims, 3 Drawing Sheets

5,620,387

DRIVE UNIT FOR A MOTOR VEHICLE

FIELD OF THE INVENTION

The present invention relates to a drive unit for a motor vehicle comprising an electric motor with a rotor, an input shaft, driven by said rotor, to a speed reducer, a differential driven by said speed reducer, and a pair of wheel axles driven by said differential, the input shaft being a hollow shaft and one of the driven wheel axles extending through the hollow shaft and the rotor.

BACKGROUND OF THE INVENTION

A known drive unit of the above mentioned type for electrically powered vehicles has a speed reducer with a differential mounted at one end of the electric motor, the axle to the driving wheel on the differential side being a short axle, while the axle to the other driving wheel extends from the differential, through the speed reducer and through the electric motor to the opposite side of the motor. Such drive units have up to now had a single gear ratio and the described design is compact and it has achieved the desired reduction of the electric motor rpm to the desired rpm for the drive wheels.

One of the many problems which must be solved before achieving a commercially viable electrically powered car is reducing the weight and volume of the drive unit and its energy source, i.e. the battery pack. Up to now, research and development has largely been focussed on the latter problem, i.e. finding means and methods for more effective storage of electrical energy than what is known today.

OBJECT OF THE INVENTION

The purpose of the present invention is in general to achieve a solution of the problem of reducing the weight and the dimensions of the drive unit itself.

SUMMARY OF THE INVENTION

This is achieved according to the invention by virtue of the fact that the drive unit is provided with a speed reducer which has at least two gear ratios.

It is well known that an electric motor can be designed to have a very flat torque curve and up to now, it has been the general view that it is sufficient to merely reduce the relatively high rpm of the electric motor, from for example about 15,000 rpm down to about 1,000 rpm, in a single-ratio speed reducer disposed between the motor and the differential, to achieve a drive unit suited to electrically powered cars.

By arranging, in accordance with the invention, a speed reducer with at least two ratios, and preferably limited to just two ratios, it has proved possible to substantially reduce the weight and the dimensions of the drive unit over a single-ratio drive unit of comparable performance. Further development, by using a speed reducer with three ratios has proved to provide relatively small advantages over the change from one to two ratios.

In a preferred embodiment of the drive unit according to the invention, the speed reducer has a first reduction step between the input shaft driven by the rotor and at least one countershaft driven by the input shaft, and a second reduction step between the countershaft and an output shaft driven by the countershaft, said output shaft driving the sun gear of a planetary gear set coupled to the differential, said planetary gear set providing a third reduction step, at least two freely rotatable gears, lockable by means of clutch means, are disposed on the associated countershaft to provide a reduction step with two gear ratios.

By combining a two-step motor-speed reduction with two ratios in a conventional cylindrical speed reducer with a third rpm reduction in a planetary gear set, a design of optimal compactness is obtained which is particularly suited to a unit in which one wheel driving axle extends from the differential side of the drive unit through the electric motor and out on its opposite side.

BRIEF DESCRIPTION OF THE DRAWINGS

The invention will be described in more detail below with reference to examples shown in the accompanying drawings, where.

DETAILED DESCRIPTION OF THE INVENTION

Figure 1:
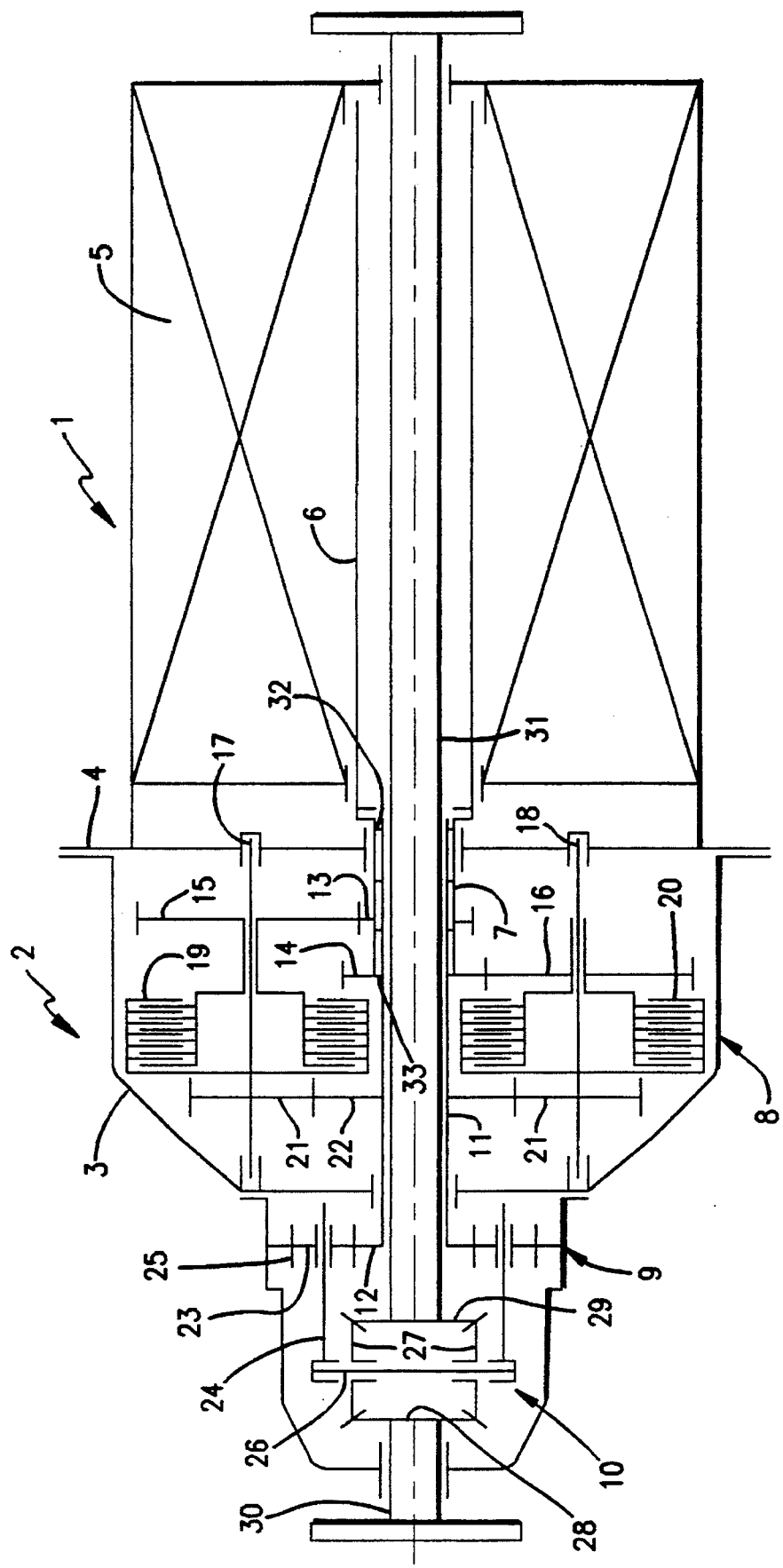
FIGS. 1, 2 and 3 show schematic representations of three different embodiments of drive units according to the invention.

In the Figures, 1 generally designates an electric motor and 2 a transmission with a housing 3, the input side of which is screwed securely to the end wall 4 of the output side of the electric motor 1. The electric motor has a stator 5 and a rotor 6. An input shaft 7 in the transmission 2 is drivingly coupled to the rotor 6. The transmission 2 comprises in all three embodiments shown in the Figures, a cylindrical speed reducer 8, a planetary gear set 9 and a differential 10.

FIG. 1 shows an embodiment in which the input shaft 7 is a hollow shaft, which is mounted concentrically with a hollow shaft 11 which non-rotatably supports the sun gear 12 of the planetary gear set 9. The shaft 7 supports non-rotatably two gears 13 and 14, each of which engages individual gears 15 and 16, respectively, on individual countershafts 17 and 18, respectively. The gears 15 and 16 are freely rotatably mounted on their respective shaft 17 and 18, and each can be locked to its shaft by means of multi-disc clutches 19 and 20, respectively. Each of the countershafts supports an identical gear 21, which engages a common gear 22 non-rotatably supported by the hollow shaft 11.

The sun gear 12 engages planet gears 23 which are supported by a planet gear carrier 24 and engage with a ring gear 25 securely joined to the housing 3. The planet gear carrier 24 is coupled to the bevel wheel carrier 26 of the differential 10. The bevel wheel carrier 26 supports bevel wheels 27 engaging bevel wheels 28, 29 on individual drive wheel axles 30, 31. Axle 31 extends through the hollow shaft 11 and the rotor 6 and out through the electric motor 1 onto the side opposite to the end wall 4.

An 80 hp electric motor with an output rpm of about 15,000 rpm requires a reduction to the differential of about 1:15. This is obtained by the transmission described above in three reduction steps. The first step (with two ratios) is provided between the gears 13 and 15, or alternatively between the gears 14 and 16. The second step is obtained between the gears 21 and 22 and the third step is obtained in the planetary gear set between the sun gear 12 and the planet gear carrier 24.

In the embodiment described above with reference to FIG. 1, the input shaft 7 is mounted in bearings 32 and 33 on the hollow shaft 11. The shaft 7 is coupled in a manner not shown in more detail here, by splines for example, to the rotor 6, and this means that the transmission 2 can be fully mounted and tested before it is connected to the electric motor 1.

In the embodiment shown in FIG. 1, the first reduction step of the transmission 2 has two ratios on the input side, i.e. on the high-speed side, and the clutches 19 and 20 are thus on the high-speed side. This design is most suitable for a relatively low-speed motor 1, i.e. a motor with a maximum speed of ca 15,000 rpm.

Figure 2:
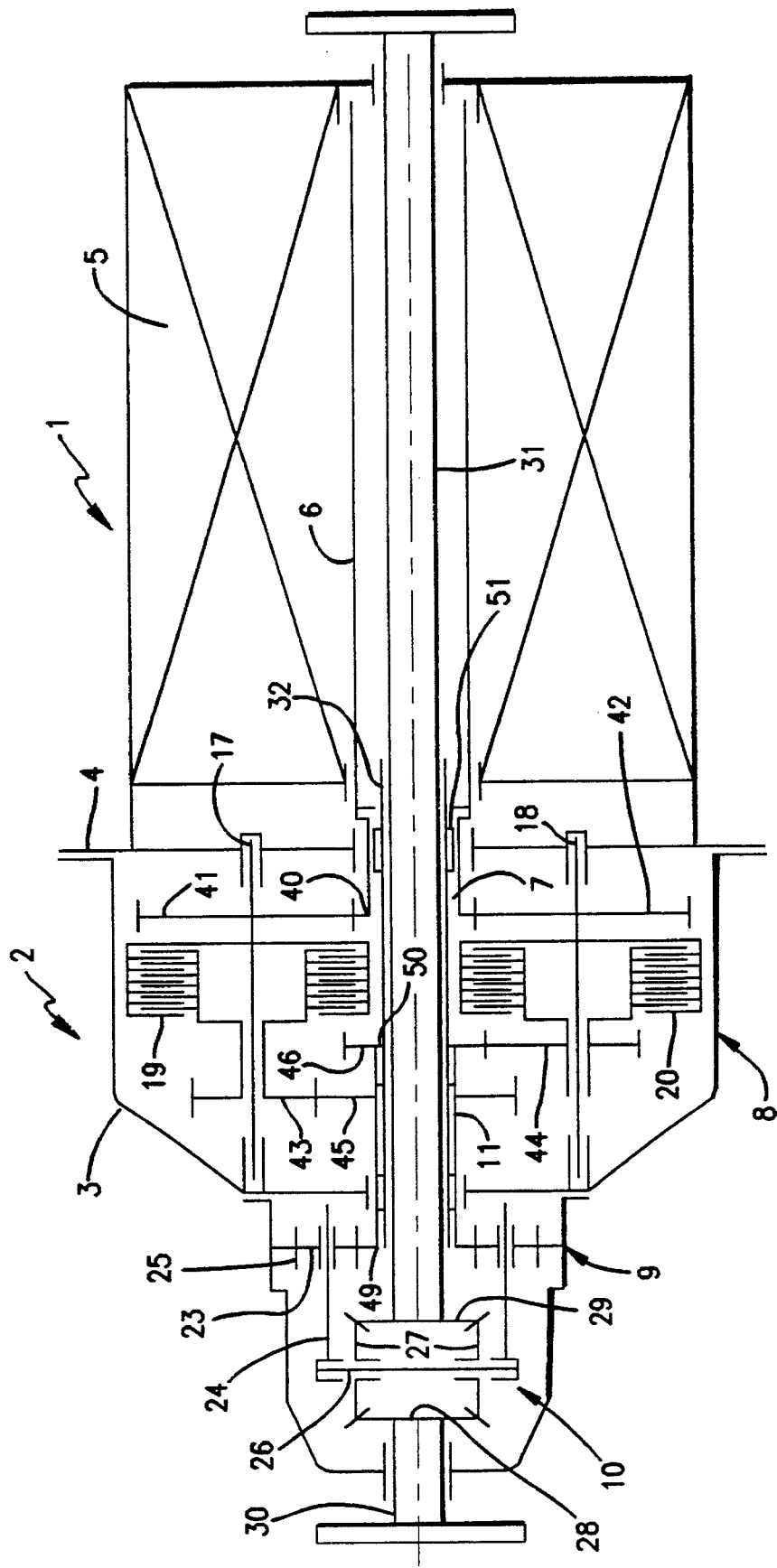
Figure 3:
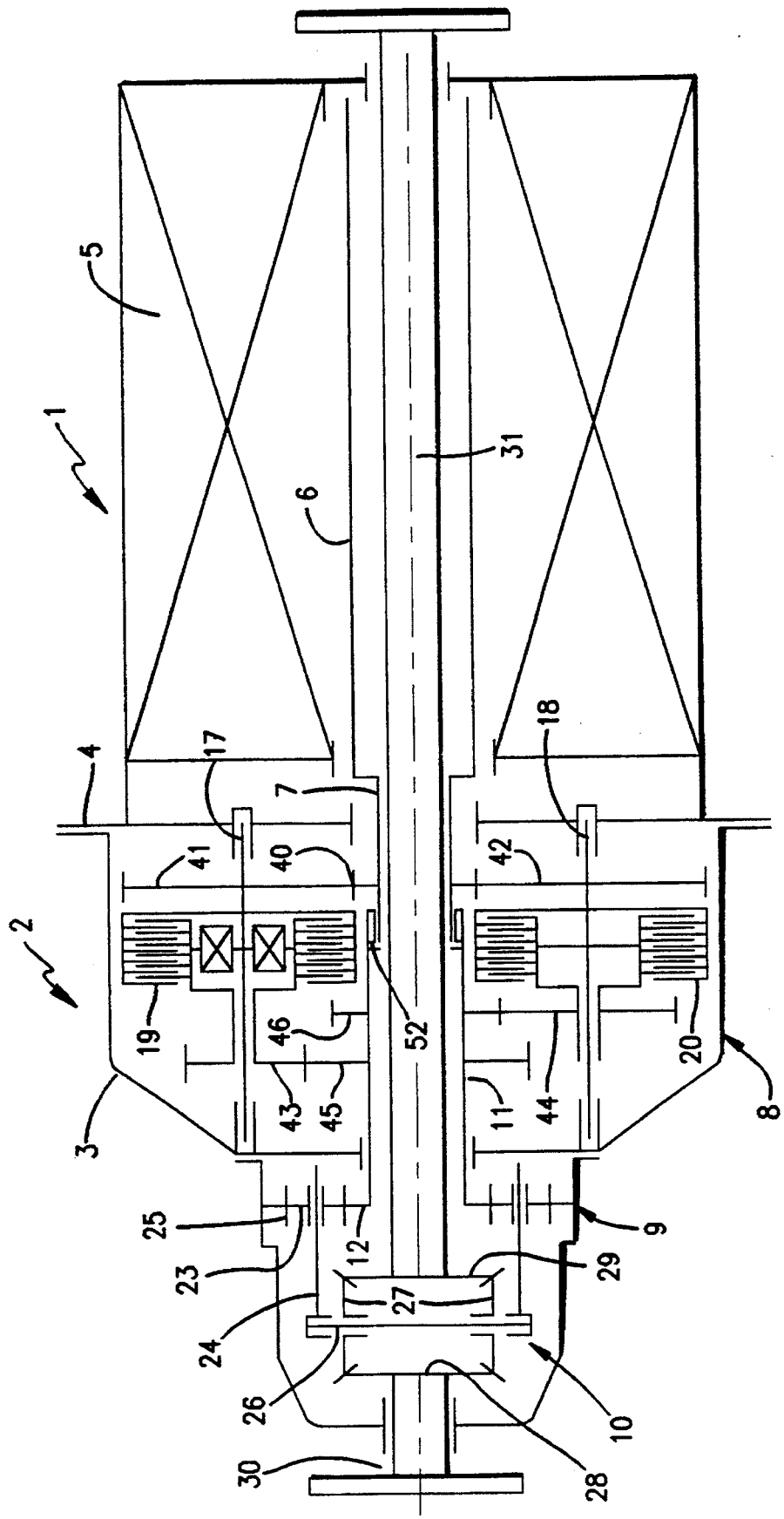

FIGS. 2 and 3 show two alternative embodiments, where details having direct counterparts in FIG. 1 have been given the same reference numerals as in FIG. 1.

The primary and principle difference between, on the one hand, the embodiment shown in FIG. 1 and, on the other hand, the embodiment shown in FIGS. 2 and 3, is that in the latter case, the second reduction step has two ratios.

On the input side, i.e. the high speed side, the input shaft 7 supports a single non-rotatably mounted gear 40, which engages two gears 41 and 42 of different sizes, said gears being fixed to countershafts 17 and 18, respectively.

The gears 43 and 44 are freely rotatably mounted on each countershaft 17 and 18 and can be locked to their respective shaft by means of clutches 19 and 20 which, in this case, are on the low-speed side.

The gears 43, 44 each engage individual gears 45, 46, respectively, on a hollow shaft 11, which carries the sun gear 12 of the planetary gear set 9. The hollow shaft 11 is mounted on a hollow shaft 48, as is the input shaft 7, via bearings 49, 50 and 51, respectively. In this case as well, the arrangement is such that the transmission 2 can be finally mounted and tested before it is connected to the electric motor 1. The design with releasable gears 43, 44 on the output side of the speed reducer 8 is in this case particularly suited to high-speed motors, i.e. motors with a maximum speed exceeding ca 20,000 rpm. The clutches 19, 20 must in this case transmit higher torque but less power than in the embodiment shown in FIG. 1, which requires higher hydraulic pressure or more discs.

Finally, FIG. 3 shows an embodiment which only differs from that shown in FIG. 2 with regard to the input shaft 7 and its mounting, and with regard to the clutch 19. The rotor 6 and the input shaft 7 in FIG. 3 are made as a solid unit in contrast to the embodiments shown in FIGS. 1 and 2, where the shaft 7 and the rotor 6 are non-rotatably but axially displaceably joined to each other, i.e. via splines. In FIG. 3, the hollow shaft 11 is mounted on the input shaft 7 via a bearing 52 between the shafts. This embodiment requires final assembly of the transmission 2 at the same time as it is connected to the motor 1. The transmission can thus not be tested separately prior to connection to the motor.

In the drive unit in FIG. 3, the clutch 19 is coupled to a lockable overrunning clutch 53, which is known per se, and which permits rotation of the gear 43 at higher rpm than the countershaft 17. The purpose of the overrunning clutch 53 is in this case to provide smooth downshifting from the higher to the lower ratio, when releasing the clutch 20 and engaging the clutch 19. The drive train is established in this case only after the motor speed has increased, so that the speed of the countershaft 17 is synchronized to the speed of the gear 43. The overrunning clutch 53 can be locked to permit motor braking, when the electric motor is to be driven as a generator to charge the car batteries.

I claim:

1. In a drive unit for a motor vehicle, comprising an electric motor (1) with a rotor (6), an input shaft (7), driven by said rotor, to a speed reducer (8,9), a differential (10) driven by said speed reducer, and a pair of wheel axles (30, 31) driven by said differential, the input shaft being a hollow shaft and one (31) of the driven wheel axles extending through the hollow shaft and the rotor, the speed reducer (8,9) having at least two gear ratios; the improvement wherein the speed reducer (8,9) has a first reduction step between the input shaft (7) driven by the rotor (6) and at least one countershaft (17,18) driven by the input shaft, and a second reduction step between the countershaft and an output shaft (11) driven by the countershaft, said output shaft (11) driving the sun gear (12) of a planetary gear set (9) coupled to the differential (10), said planetary gear set (9) providing a third reduction step, at least two freely rotatable gears (15,16;43,44), lockable by means of clutch means (19, 20), being disposed on the associated countershaft (17, 18) to provide a reduction step with two gear ratios.

2. Drive unit according to claim 1, wherein the speed reducer (8,9) has two countershafts (17,18) each having an individual freely rotatably mounted gear (15,16;43,44), which can be locked to its countershaft by means of clutch means (19,20).

3. Drive unit according to claim 2, wherein the input shaft (7) drives, firstly, a first gear (13) non-rotatably joined to the input shaft, said first gear engaging a gear (15) freely rotatable on one countershaft (17) and lockable thereon by means of a clutch (19), and, secondly, a second gear (14) non-rotatably joined to the input shaft (17) and which engages a gear (16) freely rotatable on the other countershaft (18) and lockable thereto by means of a clutch (20).

4. Drive unit according to claim 2, wherein the input shaft (7) drives a gear (40) which engages two gears (41,42) each non-rotatably mounted on individual countershafts (17,18), and that gears (43,44) freely rotatable on each countershaft and lockable to the respective countershaft by clutch means (19,20), each engage an individual gear (45, 46) on a shaft (11) which drives the sun gear (12) of a planetary gear set (9).

5. Drive unit according to claim 1, wherein the clutch means (19,20) are multi-disc clutches.

6. Drive unit according to claim 1, wherein the planet gear carrier (24) of the planetary gear set (9) drives the bevel wheel carrier (26) of the differential (10).

7. Drive unit according to claim 5, wherein the clutch means, in addition to multi-disc clutches (19,20), comprise a lockable overrunning clutch (53), which, when the multi-disc clutch is engaged, permits rotation of the releasable gears (43,44) on the countershafts at a higher rotational speed than the rotational speed of the respective countershaft (17).

* * * * *